S. R HIGGINS.
Hay Raker and Loader.
No. 77,817. Patented May 12, 1868.
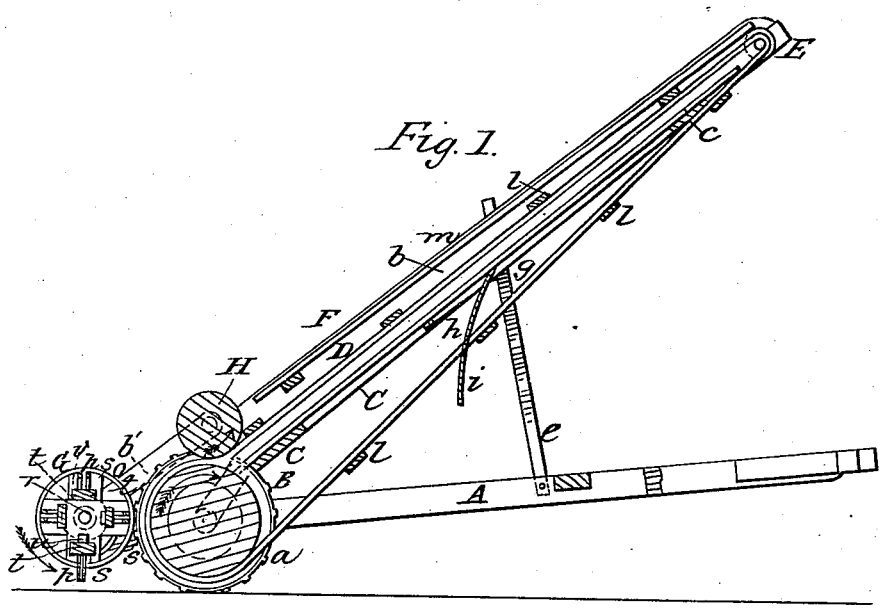
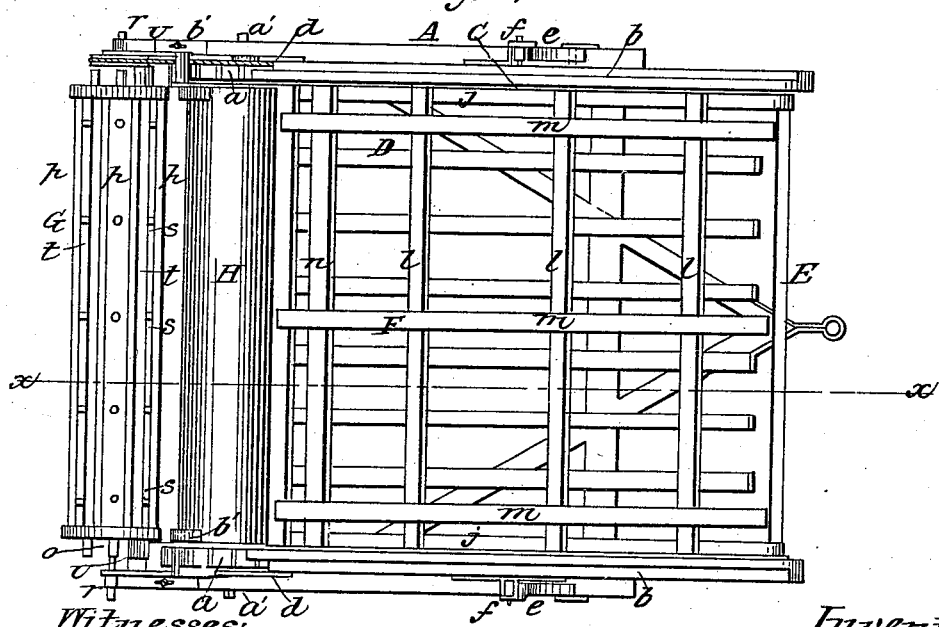
Witnesses:
Theo Tusche
Wm Brown
Inventor:
S. R. Higgins
Per Munn
Attorneys

United States Patent Office.

S. R. HIGGINS, OF PARMA, MICHIGAN.

Letters Patent No. 77,817, dated May 12, 1868.

---

IMPROVEMENT IN HAY-RAKERS AND LOADERS.

---

The Schedule referred to in these Letters Patent and making part of the same.

---

TO ALL WHOM IT MAY CONCERN:

Be it known that I, S. R. HIGGINS, of Parma, in the county of Jackson, and State of Michigan, have invented a new and improved Machine for Loading Hay and Grain; and I do hereby declare that the following is a full, clear, and exact description thereof, which will enable those skilled in the art to make and use the same, reference being had to the accompanying drawings, forming part of this specification.

This invention relates to a new and useful machine, to be attached to a wagon or cart, for the purpose of loading the same with hay or grain as it is drawn over the field.

The invention consists of an endless carrier, placed within a suitable frame, and arranged in connection with rollers and a revolving rake or picker, all being constructed substantially as hereinafter fully shown and described, whereby the desired work may be done in the most efficient manner.

In the accompanying sheet of drawings—

Figure 1 is a side sectional view of my invention.

Figure 2, a plan or top view of the same.

Similar letters of reference indicate corresponding parts.

A represents the main frame of the machine, which is provided with a tongue or pole, the latter, when the machine is in use being attached to the rear part of a wagon or cart.

In the rear part of the main frame, A, there is fitted a roller, B, the ends of the shaft of which have wheels, $a$, secured upon them, to prevent the slipping of said roller.

C represents a frame, composed of two side-pieces, $b\ b$, connected by cross-bars $c$, and having a bottom composed of slats, $a^\times$.

The inner ends of these side-pieces have bars $d$ attached, one to each, and these bars are fitted loosely on the shaft of roller B, just within the side-pieces of the frame A.

The frame C, by this arrangement or mode of connection, may be raised or lowered to any desired angle of inclination, and said frame secured at the desired height by means of uprights $e\ e$, attached by pivots, one to each side of frame A, and passing through guides $f$, attached one to each side of frame C.

The inner surfaces of the uprights $e\ e$ are notched to receive bolts $g$, which are attached to springs $h$, and these springs have cords $i$ connected to them.

By pulling the cords, the bolts $g$ may be withdrawn at any time, and the frame C adjusted to the desired angle of inclination.

D is an endless carrier or elevator, composed of the belts $j\ j$, which pass around the roller B, and around pulleys on a shaft, E, in the upper part of the frame C, said belts having cross-slats, $l$, attached to them.

F represents a guard, composed of bars, $m$, three, more or less, which are attached, at their lower ends, to a cross-bar, $n$, the ends of which are fitted loosely in the sides of the frame C, the bars $m$ being parallel with the sides of frame C.

Directly behind the roller B there is a revolving rake or picker, G, which is composed of two heads, $o\ o$, connected by bars $p$, the latter being connected to the heads near their peripheries.

Each head is provided with an axis, $r$, and these axes have their bearings at the rear ends of the side-pieces of the frame A.

The rakes are formed of teeth, $s$, driven in or attached to bars $t$, the ends of which are fitted in radial guides or slots, $u$, in the heads $o\ o$, and the teeth $s$ pass through holes in the bars $p$.

To the rear ends of the side-pieces of the frame A there are attached curved plates $v$, against which the ends of the rake-bars $t$ come in contact as the rake revolves. This rake is rotated by a cross-belt $w$, from the roller B.

H is a roller, the journals, $a'$, of which are fitted in an end of bars $b'\ b'$, the opposite ends of said bars being fitted loosely on the axes, $r$, of the heads, $o\ o$, of the revolving rake. This roller, H, is directly over the roller B, as shown more particularly in fig. 1.

As the machine is drawn along, the roller, B, is turned in the direction of the arrow indicated upon it, and the roller, H, which receives its motion from B, is rotated in a reverse direction, as is also indicated by the arrow upon it.

The rake or picker, G, is rotated by the cross-belt $w$ in the direction indicated by the arrow underneath it, and the rake picks up the cut grass (hay) or grain, and delivers it to the "bite" of the rollers, B H, between which the hay or grain passes, and is conveyed to the carrier D, the latter liberating it and depositing it in the cart or wagon.

The guard F prevents the hay or grain being blown from the elevator or carrier as it is elevated thereby.

The teeth, $s$, of the bars $t$ are drawn out from the hay or grain just previous to the latter reaching the "bite" of the rollers, in consequence of the ends of the rake-bars coming in contact with the curved plates $v$, which draw down the rake-bars at the proper time, said bars, as they pass down at the rear sides of the heads, dropping by virtue of their own gravity, so that the teeth $s$ are brought in proper working position at the proper time.

I claim as new, and desire to secure by Letters Patent—

1. The two rollers B H, in combination with the endless carrier D, guard F, the adjustable frame C, and the main frame A, all constructed and arranged to operate in the manner substantially as and for the purpose set forth.

2. The revolving rake or picker, G, in combination with the rollers B H, arranged substantially as and for the purpose specified.

3. Constructing the revolving rake or picker with movable rake-bars $t$, arranged so as to be operated by the curved plates $u$ and their own gravity, substantially as shown and described.

S. R. HIGGINS.

Witnesses:
　JOHN B. GREMBY,
　C. E. McGEE.